US012692935B2

(12) United States Patent
Oyaizu et al.

(10) Patent No.: US 12,692,935 B2
(45) Date of Patent: Jul. 28, 2026

(54) TRANSMISSION DEVICE WITH OIL DISCHARGING GROOVE

(71) Applicant: MUSASHI SEIMITSU INDUSTRY CO., LTD., Toyohashi (JP)

(72) Inventors: Kazuma Oyaizu, Toyohashi (JP); Hiroki Niimi, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 18/994,821

(22) PCT Filed: Jul. 15, 2022

(86) PCT No.: PCT/JP2022/027908
§ 371 (c)(1),
(2) Date: Jan. 15, 2025

(87) PCT Pub. No.: WO2024/013994
PCT Pub. Date: Jan. 18, 2024

(65) Prior Publication Data
US 2026/0016083 A1 Jan. 15, 2026

(51) Int. Cl.
*F16H 57/04* (2010.01)
*F16H 37/08* (2006.01)
(Continued)

(52) U.S. Cl.
CPC ....... *F16H 57/0483* (2013.01); *F16H 37/082* (2013.01); *F16H 48/40* (2013.01);
(Continued)

(58) Field of Classification Search
CPC ....... F16H 57/0427–0431; F16H 48/08; F16H 48/40; F16H 57/04–0424; F16H 57/0479;
(Continued)

(56) References Cited

U.S. PATENT DOCUMENTS 9,587,730 B2 3/2017 Mori
11,279,218 B2 * 3/2022 Hibino ................ F16H 57/0427
(Continued)

FOREIGN PATENT DOCUMENTS

CN 109109640 A 1/2019
EP 3848214 A1 7/2021
(Continued)

OTHER PUBLICATIONS

PCT/ISA/210 for International Application PCT/JP2022/027906 with the English translation thereof.
(Continued)

*Primary Examiner* — Ernesto A Suarez
*Assistant Examiner* — Lillian T Nguyen
(74) *Attorney, Agent, or Firm* — Carrier, Shende & Associates P.C.; Fulchand P. Shende; Joseph P. Carrier

(57) ABSTRACT

The present disclosure provides a transmission device that can enhance a lubricity of a differential mechanism without using a pump. The present disclosure is a transmission device including a differential case and a differential mechanism arranged inside the differential case. The differential mechanism includes first and second pinion gears and first and second side gears. The differential case includes a housing, first and second sleeves coupled to the housing, an oil discharging groove extending from an outer end of the first sleeve to an interior of the housing, and an oil introducing groove extending from an outer end of the second sleeve to the interior of the housing. The oil discharging groove is arranged such that the oil discharging groove reaches an internal space of the housing at a radial outside of the first side gear and increases in width toward the outer end of the first sleeve.

4 Claims, 10 Drawing Sheets

(51) Int. Cl.

| | |
|---|---|
| *F16H 48/08* | (2006.01) |
| *F16H 48/40* | (2012.01) |
| *F16H 57/037* | (2012.01) |
| *F16H 57/02* | (2012.01) |

(52) U.S. Cl.
CPC ......... *F16H 57/037* (2013.01); *F16H 57/043* (2013.01); *F16H 48/08* (2013.01); *F16H 2057/02052* (2013.01); *F16H 57/0424* (2013.01)

(58) Field of Classification Search
CPC .. F16H 57/0483; F16H 57/037; F16H 57/043; F16H 2057/02052
See application file for complete search history.

(56) References Cited

U.S. PATENT DOCUMENTS

| | | | |
|---|---|---|---|
| 11,821,513 | B2 | 11/2023 | Oshidari |
| 2011/0203898 | A1 | 8/2011 | Harashima et al. |
| 2012/0252627 | A1 | 10/2012 | Koyama et al. |
| 2013/0283972 | A1 | 10/2013 | Yamamoto et al. |
| 2017/0254401 | A1* | 9/2017 | Matsuoka ........... F16H 57/0427 |
| 2018/0328480 | A1 | 11/2018 | Nakano et al. |
| 2021/0213819 | A1 | 7/2021 | Hibino et al. |
| 2022/0268346 | A1 | 8/2022 | Sekiguchi |
| 2023/0050981 | A1 | 2/2023 | Suzuki et al. |
| 2024/0026966 | A1 | 1/2024 | Oda et al. |
| 2024/0102548 | A1* | 3/2024 | Oyaizu .............. F16H 57/0432 |
| 2024/0240709 | A1* | 7/2024 | Asai ................... F16H 57/0486 |

FOREIGN PATENT DOCUMENTS

| | | |
|---|---|---|
| JP | H07-301306 A | 11/1995 |
| JP | 2011-174582 A | 9/2011 |
| JP | 2015-052374 A | 3/2015 |
| JP | 2015-105730 A | 6/2015 |
| JP | 2018-189179 A | 11/2018 |
| JP | 2020-142774 A | 9/2020 |
| JP | 2021-025570 A | 2/2021 |
| JP | 2021-110374 A | 8/2021 |
| WO | 2011/077869 A1 | 6/2011 |
| WO | 2012/105482 A1 | 8/2012 |
| WO | 2021/137283 A1 | 7/2021 |
| WO | 2021/137289 A1 | 7/2021 |
| WO | 2022/054135 A1 | 3/2022 |

OTHER PUBLICATIONS

PCT/ISA/237 for International Application PCT/JP2022/027906 with the English translation thereof.
PCT/ISA/210 for International Application PCT/JP2022/027907 with the English translation thereof.
PCT/ISA/237 for International Application PCT/JP2022/027907 with the English translation thereof.
Office Action issued in counterpart Japanese Patent Application No. 2024-533484 dated Nov. 26, 2024 with the machine-generated full English translation.
PCT/ISA/210 for International Application PCT/JP2022/027908 with the English translation thereof.
PCT/ISA/237 for International Application PCT/JP2022/027908 with the English translation thereof.
Office Action, Notice of Reason(s) for Refusal, dated May 7, 2025 issued in the corresponding Japanese Patent Application No. 2024-533483 with the English translation thereof.
Office Action issued on Dec. 10, 2025 in the corresponding U.S. Appl. 18/994,784.
Office Action issued on Mar. 4, 2026 in the corresponding U.S. Appl. No. 18/994,868.
Office Action issued on Jun. 23, 2026 in the corresponding U.S. Appl. No. 18/994,784.

\* cited by examiner

TRANSMISSION DEVICE WITH OIL DISCHARGING GROOVE

TECHNICAL FIELD

The present disclosure relates to a transmission device.

BACKGROUND ART

In a transmission device having a differential mechanism, a configuration is known in which oil for lubrication is supplied to the differential mechanism using a pump (see Patent Document 1).

PRIOR ART DOCUMENTS

Patent Documents

Patent Document 1: Japanese Unexamined Patent Application Publication No. 2011-174582

SUMMARY OF THE INVENTION

Problems to be Solved by the Invention

The transmission device as described above requires a pump for oil supply, thereby making a structure of the device complex.

In one aspect of the present disclosure, it is preferable to provide a transmission device that can enhance a lubricity of a differential mechanism without using a pump.

Means for Solving the Problems

One aspect of the present disclosure is a transmission device comprising a sun gear, a ring gear arranged concentrically with the sun gear, planetary gears meshing with the sun gear and with the ring gear, a differential case supporting the planetary gears in a rotatable manner, a differential mechanism arranged inside the differential case, a first output shaft and a second output shaft that are coupled to the differential mechanism, and a gear case supporting the differential case in a rotatable manner.

The differential mechanism includes a first pinion gear and a second pinion gear that each have an axial center of rotation perpendicular to an axial center of rotation of the sun gear and that face each other, and a first side gear and a second side gear that each have an axial center of rotation coincident with the axial center of rotation of the sun gear and that face each other. The first side gear meshes with the first pinion gear and with the second pinion gear and is coupled to the first output shaft. The second side gear meshes with the first pinion gear and with the second pinion gear and is coupled to the second output shaft.

The differential case includes: a housing in which the first pinion gear, the second pinion gear, the first side gear, and the second side gear are housed; a first sleeve that is coupled to the housing and through which the first output shaft is inserted; a second sleeve that is coupled to the housing and through which the second output shaft is inserted; at least one oil discharging groove that is provided on an inner circumferential surface of the first sleeve and that extends from an outer end of the first sleeve to an interior of the housing; and at least one oil introducing groove that is provided on an inner circumferential surface of the second sleeve and that extends from an outer end of the second sleeve to the interior of the housing.

The at least one oil discharging groove reaches an internal space of the housing at a radial outside of the first side gear and increases in width toward the outer end of the first sleeve, as viewed in an axial direction of the first side gear.

According to the configuration above, the oil discharging grooves enable the oil to be efficiently discharged from the interior of the housing. This enhances the oil supply to the housing. As a result, the lubricity of the differential mechanism can be enhanced without using a pump.

In one aspect of the present disclosure, the at least one first oil introducing groove may increase in width toward the housing. According to the configuration above, the oil can be efficiently supplied to the differential mechanism by centrifugal force resulting from rotation of the differential case.

In one aspect of the present disclosure, the transmission device may comprise a communication member including a communication hole that allows an opening at the outer end of the first sleeve to communicate with an external space of the sun gear. The sun gear may overlap with the first sleeve in a radial direction of the sun gear. According to the configuration above, the oil discharged from the housing can be returned, over a short distance, to a speed reduction system including the sun gear. As a result, the oil circulation can be enhanced.

In one aspect of the present disclosure, the communication member may include the communication hole and an enlarged diameter part having an inner diameter that is larger than the outer end of the first sleeve. According to the configuration above, the oil can be stored in the enlarged diameter part. This promotes the oil discharge through the communication holes.

EXPLANATION OF REFERENCE NUMERALS

1 . . . transmission device, 2 . . . sun gear, 3 . . . ring gear, 4 . . . planetary gears, 5 . . . planetary gear bearings, 6 . . . differential case, 7 . . . differential mechanism, 8A . . . first output shaft, 8B . . . second output shaft, 9 . . . gear case, 10 . . . motor shaft, 22 . . . enlarged diameter part, 23 . . . communication holes, 61 . . . housing, 62 . . . carrier, 63 . . . bearing holders, 64 . . . first sleeve, 65A through 65D . . . oil discharging grooves, 66 . . . second sleeve, 67A through 67D . . . oil introducing grooves, 71 and 72 . . . pinion gears, 73 . . . pinion shaft, 74 and 75 . . . side gears, 631 . . . cylindrical parts, 632 . . . legs, 633 . . . pockets, 661 and 662 . . . projections, 911 . . . protrusion, 912 . . . inclined surface, 913 . . . recess.

MODE FOR CARRYING OUT THE INVENTION

Hereinafter, embodiments to which the present disclosure is applied are described with reference to the drawings.

1. First Embodiment

[1-1. Configuration]

Figure 1:
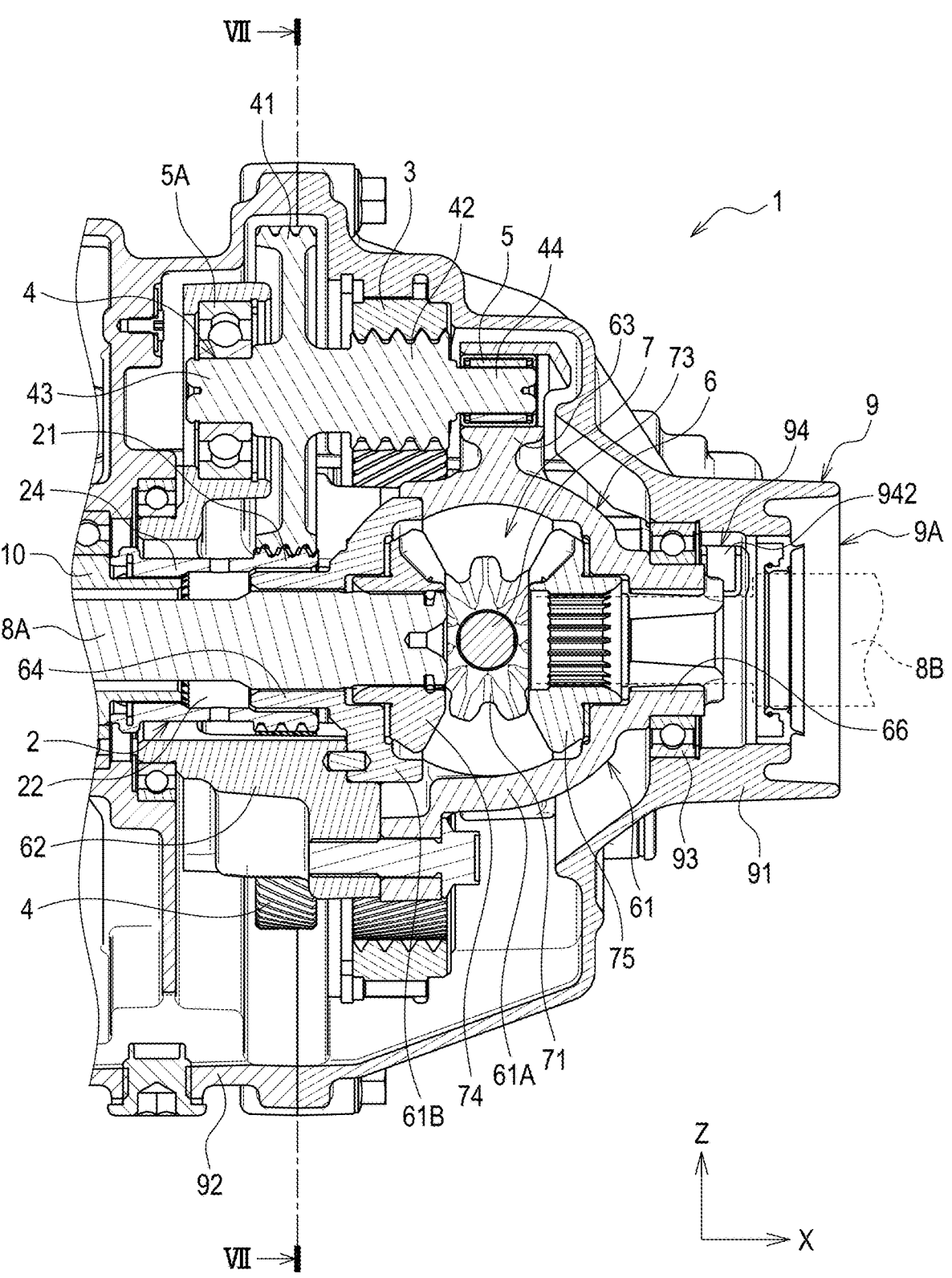
FIG. 1 is a schematic sectional view of a transmission device in an embodiment.

A transmission device 1 shown in FIG. 1 is a device that is mounted in an automobile and that transmits a drive power from a drive source of the automobile to its wheel.

The transmission device 1 comprises a sun gear 2, a ring gear 3, planetary gears 4, planetary gear bearings 5, a differential case 6, a differential mechanism 7, a first output shaft 8A, a second output shaft 8B, a gear case 9, and a motor shaft 10.

In the present embodiment, an axial direction of the sun gear 2 is an X-axis, a vertical direction of the sun gear 2 is a Z-axis, a direction perpendicular to both the X-axis and the Z-axis is a Y-axis.

<Motor Shaft>

The motor shaft 10 is drivingly coupled to a motor (not shown) and axially rotated by a driving force of the motor.

<Sun Gear>

The sun gear 2, together with the ring gear 3 and the planetary gears 4, forms a planetary gear mechanism (i.e., gear reduction mechanism). The sun gear 2 is located outside the differential case 6 and inside the gear case 9.

The sun gear 2 is drivingly coupled to the motor shaft 10 and axially rotated by the driving force of the motor. An axial center of rotation of the sun gear 2 is the same as an axial center of rotation of the first output shaft 8A and the second output shaft 8B.

Figure 2:
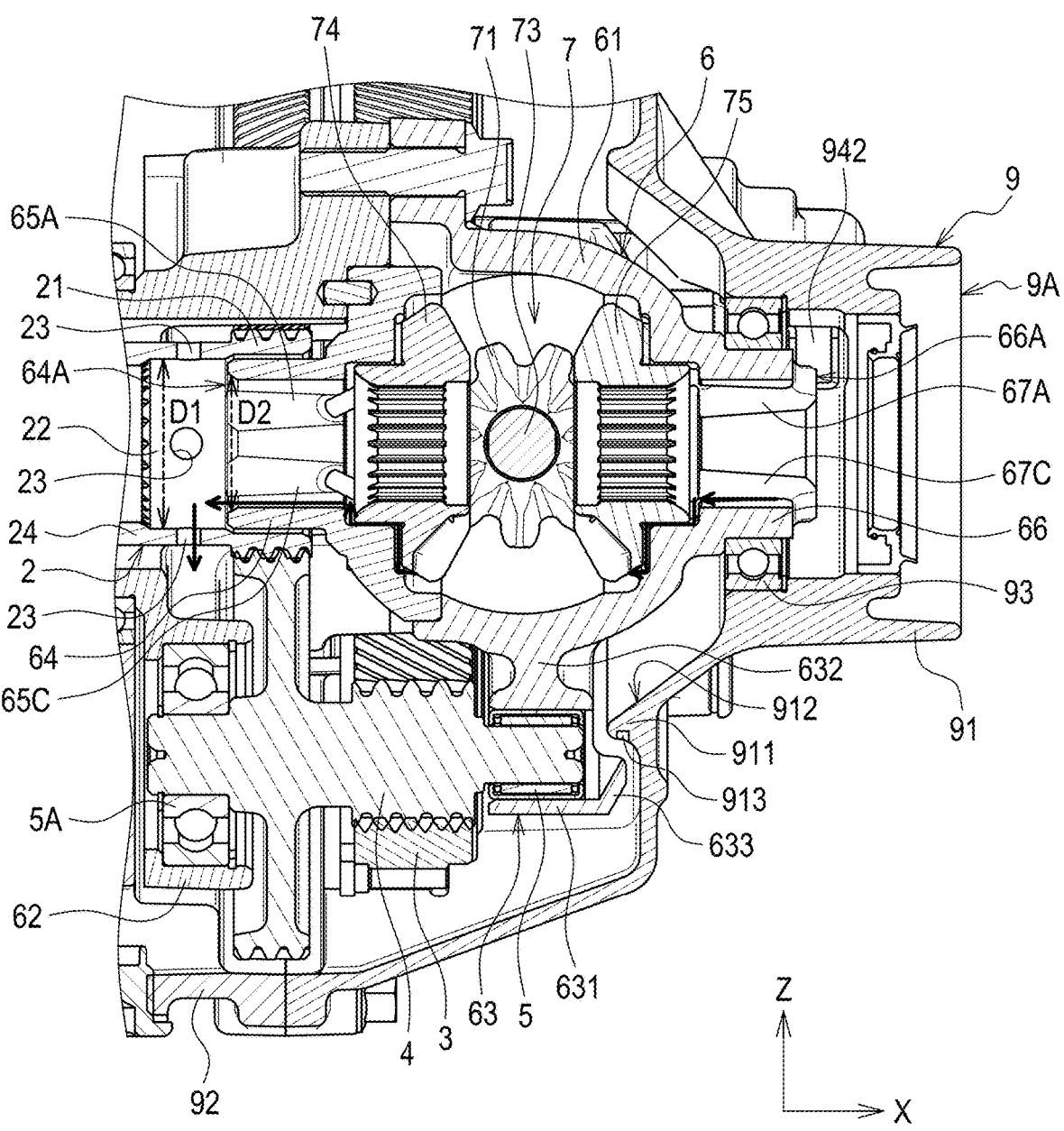
FIG. 2 is a partially enlarged schematic sectional view of the transmission device of FIG. 1.

The first output shaft 8A and a first sleeve 64 of the differential case 6 are inserted through the sun gear 2. As shown in FIG. 2, the sun gear 2 includes a gear part 21, an enlarged diameter part 22, communication holes 23, and a connection part 24. FIG. 2 illustrates a state in which the planetary gear 4 is moved downward from an upper position in FIG. 1 by revolution.

The gear part 21 is an external gear that is cylindrical and that meshes with the planetary gears 4. The first sleeve 64 of the differential case 6 is inserted into the gear part 21 such that a slight gap is radially provided. In other words, the sun gear 2 overlaps with the first sleeve 64 in a radial direction of the sun gear 2. An inner diameter of the gear part 21 is greater than an outer diameter of the first sleeve 64.

The enlarged diameter part 22 is a tubular portion that is continuous with the gear part 21. The enlarged diameter part 22 is coupled to an end of the gear part 21 opposite to the differential mechanism 7. An inner diameter D1 of the enlarged diameter part 22 is greater than an inner diameter D2 of an outer end 64A of the first sleeve 64. The first sleeve 64 is not inserted into the enlarged diameter part 22. The inner diameter D1 of the enlarged diameter part 22 is greater than an outer diameter of a portion of the motor shaft 10 that is inserted into the connection part 24.

The communication holes 23 each allow an opening in the outer end 64A of the first sleeve 64 to communicate with a space outside the sun gear 2. The communication holes 23 are arranged apart from each other in a circumferential direction of the enlarged diameter part 22. In the present embodiment, four communication holes 23 are arranged apart from each other at 90° in a circumferential direction of the sun gear 2. However, the number of communication holes 23 is not limited to four.

The communication holes 23 allow lubricating oil that has discharged from the first sleeve 64 to discharge, by gravity or centrifugal force, into a planetary gear accommodation space located between the differential case 6 and the gear case 9. The sun gear 2 in the present embodiment serves as a gear constituting a planetary gear mechanism and as a communication member defining a circulation path for the lubricating oil.

The connection part 24 is a tubular portion that is continuous with the enlarged diameter part 22. The connection part 24 is coupled to an end of the enlarged diameter part 22 opposite to the gear part 21. As shown in FIG. 1, an end portion of the motor shaft 10 is spline-fitted to the connection part 24. An inner diameter of the connection part 24 is smaller than that of the enlarged diameter part 22.

<Ring Gear>

The ring gear 3 is arranged concentrically with the sun gear 2. The ring gear 3 is fixed to an inner surface of the gear case 9 and does not rotate with respect to the gear case 9. The ring gear 3 is an internal gear with which the planetary gears 4 mesh.

<Planetary Gear>

The planetary gears 4 each mesh with the sun gear 2 and with the ring gear 3. The planetary gears 4 revolve around the axial center of rotation of the sun gear 2. In the present embodiment, the three planetary gears 4 are arranged, but the number of planetary gears 4 is not limited to three.

The axial center of rotation of each of the planetary gears 4 is parallel to the axial center of rotation of the sun gear 2 (i.e., X-axis). The planetary gears 4 are held by the differential case 6. Each of the planetary gears 4 includes a first gear part 41, a second gear part 42, a first shaft 43, and a second shaft 44.

The first gear part 41 is an external gear that meshes with the sun gear 2. The second gear part 42 is an external gear that meshes with the ring gear 3. An outer diameter of the second gear part 42 is smaller than that of the first gear part 41. The second gear part 42 is arranged closer to an opening end 9A of the gear case 9 than the first gear part 41 is.

The first shaft 43 constitutes an end portion of each planetary gear 4 opposite to the opening end 9A. The first shaft 43 is held by a carrier 62 of the differential case 6. Specifically, the first shaft 43 is inserted through a ball bearing SA held by the carrier 62.

The second shaft 44 constitutes an end portion of each planetary gear 4 that is closer to the opening end 9A. The second shaft 44 is held by the differential case 6. Specifically, the second shaft 44 is inserted through a corresponding one of the planetary gear bearings S held by a bearing holder 63 of the differential case 6.

<Planetary Gear Bearing>

Through each of the planetary gear bearings 5, a corresponding one of the second shafts 44 of the planetary gears 4 is inserted. The planetary gear bearings 5 are not particularly limited as long as the bearings can support the planetary gears 4 in a rotatable manner, but known needle bearings, for example, are preferable.

<Differential Case>

The differential case 6 supports the planetary gears 4 in a rotatable manner and houses the differential mechanism 7. The differential case 6 is supported by the gear case 9 in a rotatable manner. As the planetary gears 4 revolve, the differential case 6 rotates around the axial center of rotation of the sun gear 2.

As shown in FIG. 2, the differential case 6 includes a housing 61, the carrier 62, the bearing holders 63, the first sleeve 64, oil discharging grooves 65A, 65B, 65C, 65D, a second sleeve 66, and oil introducing grooves 67A, 67B, 67C, 67D.

Figure 4:
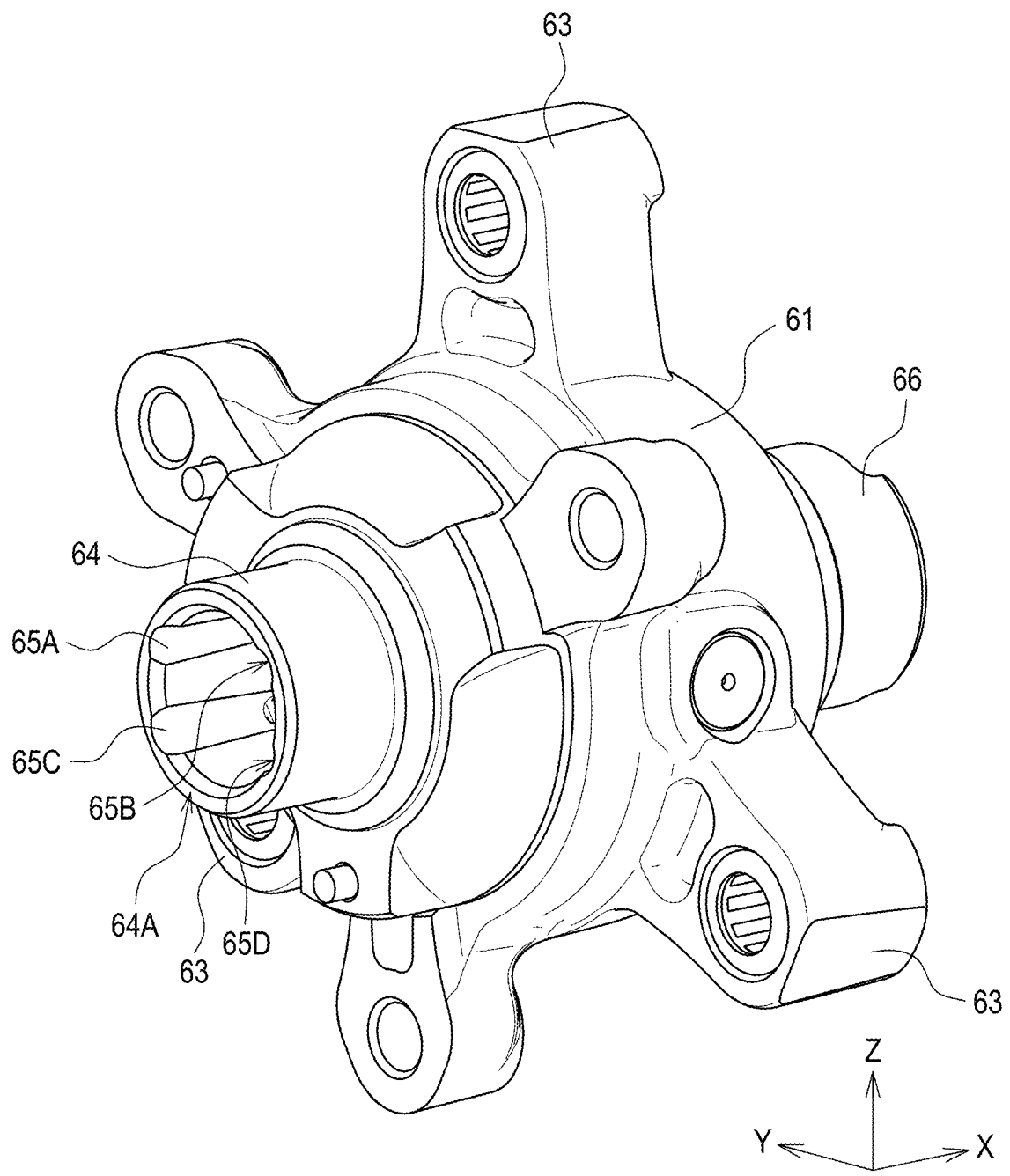
FIG. 4 is a schematic perspective view of a portion of the differential case of FIG. 3.
Figure 5:
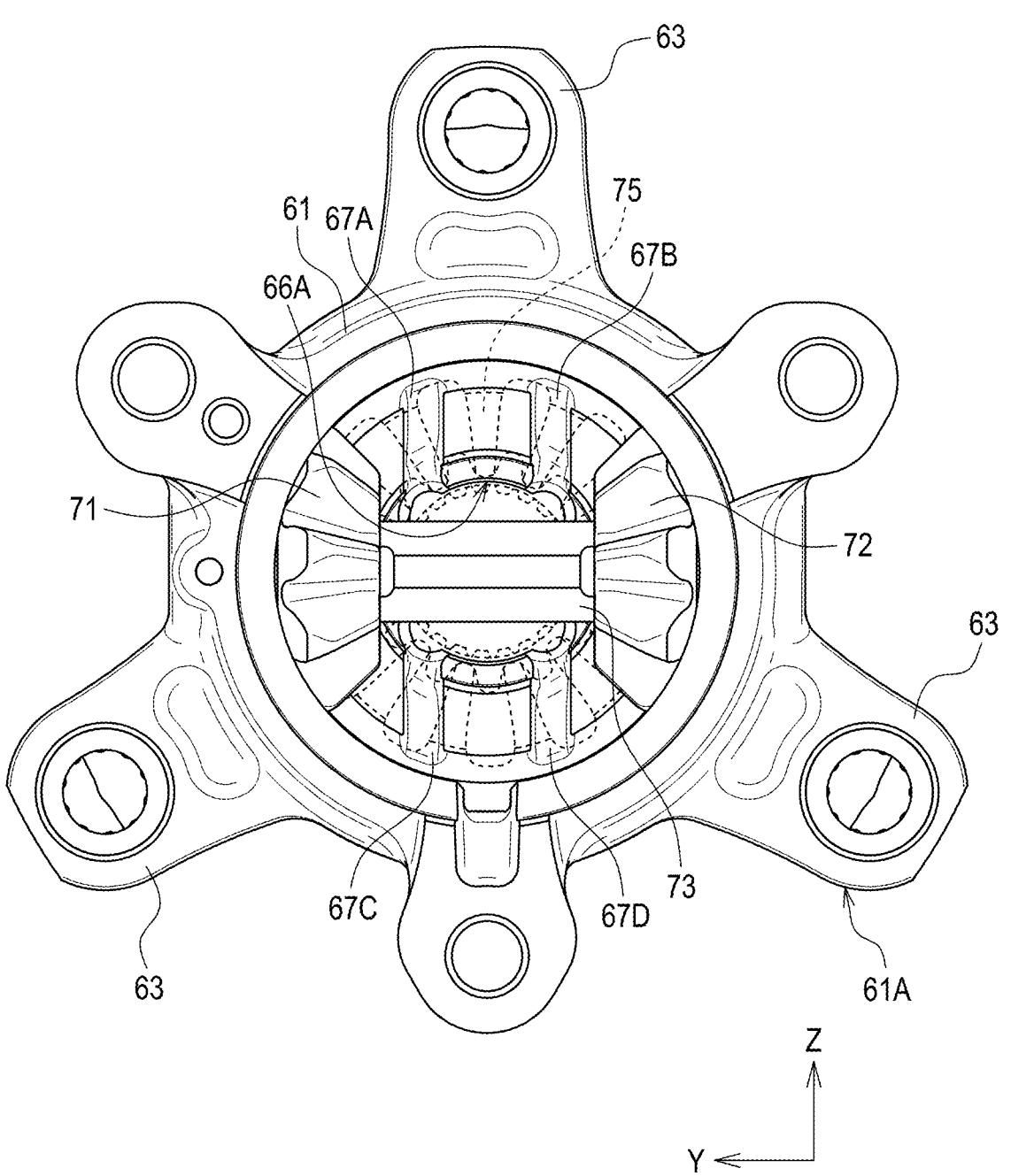
FIG. 5 is a schematic rear view of a portion of the differential case of FIG. 3.

FIG. 2 shows only the first oil discharging groove 65A and the third oil discharging groove 65C, and the second oil discharging groove 65B and the fourth oil discharging groove 65D are shown in FIG. 4. Similarly, FIG. 2 shows only the first oil introducing groove 67A and the third oil introducing groove 67C, and the second oil introducing groove 67B and the fourth oil introducing groove 67D are shown in FIG. 5.

<Housing>

The housing 61 is a main body of the differential case 6 and houses the differential mechanism 7. As shown in FIG. 1, the housing 61 is formed by coupling a first part 61A and a second part 61B in a direction parallel to the X-axis.

<Carrier>

The carrier 62 is arranged such that the carrier 62 covers the housing 61 from a position of the gear case 9 opposite to the opening end 9A (i.e., a position closer to the motor shaft 10). The carrier 62 is fixed to the housing 61 by a fastener, for example, a bolt.

<Bearing Holder>

Figure 3:
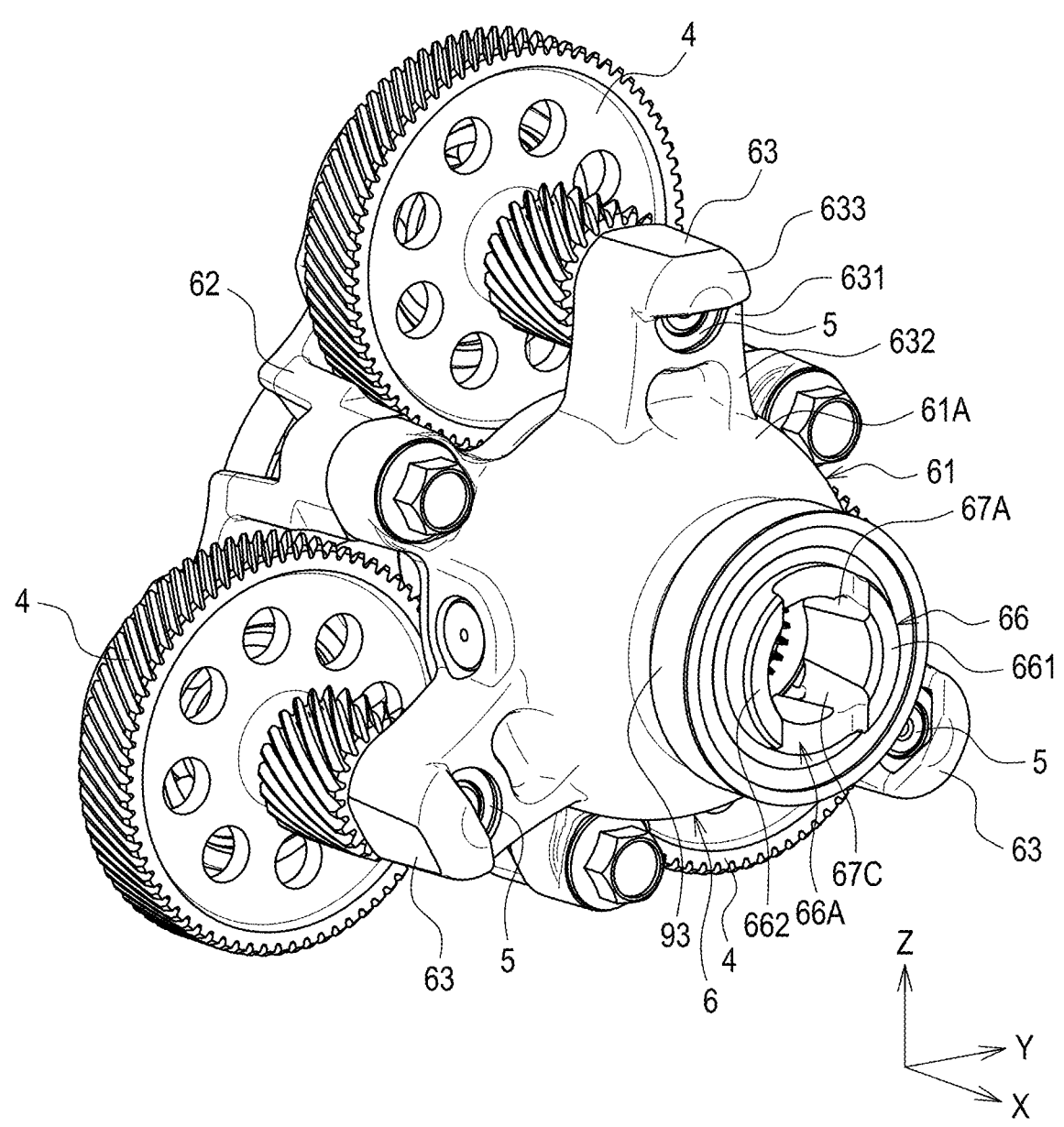
FIG. 3 is a schematic perspective view of planetary gears and a differential case in the transmission device of FIG. 1.

The bearing holders 63 each hold a corresponding one of the planetary gear bearings 5. As shown in FIG. 3, the bearing holders 63 are arranged on an outer circumferential surface of the housing 61.

The bearing holders 63 are arranged apart from each other in a circumferential direction of the housing 61 (i.e., the circumferential direction of the sun gear 2). The bearing holders 63 each includes a cylindrical part 631, a leg 632, and a pocket 633.

Each of the cylindrical parts 631 holds any one of the planetary gear bearings 5. Specifically, the planetary gear bearings 5 are axially inserted into the cylindrical parts 631. The leg 632 extends radially outward from the outer circumferential surface of the housing 61 and couples the housing 61 and the cylindrical part 631 to each other.

The pocket 633 of each bearing holder 63 protrudes from an end of the cylindrical part 631 opposite to the corresponding planetary gear 4. The pocket 633 is recessed from a radially inner side of the sun gear 2 toward a radially outer side of the sun gear 2 (i.e., direction away from the axial center of rotation of the sun gear 2) to have an internal space. Also, each pocket 633 overlaps with the corresponding planetary gear bearing 5 in the axial direction of the sun gear 2.

In other words, each pocket 633 includes a bottom wall intersecting the radial direction of the sun gear 2, two side walls intersecting the circumferential direction of the sun gear 2, and a front wall intersecting the X-axis. The front wall in each pocket 633 covers a portion of the corresponding planetary gear bearing 5 and a portion of the corresponding cylindrical part 631 in a direction parallel to the X-axis. The internal space in each pocket 633 permits liquid to enter from the radially inner side of the sun gear 2. The internal space in each pocket 633 communicates with a hollow space in the cylindrical part 631.

The bearing holders 63 are integral with the housing 61 and serve as a portion of the first part 61A. The cylindrical part 631 and the pocket 633 in each pocket 633 are integral with each other. Each pocket 633 is simultaneously formed together with a hole in the corresponding cylindrical part 631 when the first part 61A is processed. This makes it relatively easy to form the pockets 633 that are difficult to form by casting due to its small thickness.

<First Sleeve>

The first sleeve 64 shown in FIG. 1 is a tubular portion that is coupled to the housing 61 and through which the first output shaft 8A is inserted.

The first sleeve 64 extends from the housing 61 toward the motor shaft 10 along the X-axis. The first sleeve 64 allows an internal space in the housing 61 and an outside of the housing 61 (specifically, internal space in the sun gear 2) to communicate with each other.

A portion of the first sleeve 64 is inserted into the sun gear 2. A central axis of the first sleeve 64 coincides with the axial center of rotation of the sun gear 2. An inner diameter of the first sleeve 64 is smaller than a maximum inner diameter of the housing 61.

<Oil Discharging Groove>

As shown in FIG. 4, the first oil discharging groove 65A, the second oil discharging groove 65B, the third oil discharging groove 65C, and the fourth oil discharging groove 65D are provided on an inner circumferential surface of the first sleeve 64 and extend from the outer end 64A of the first sleeve 64 into the housing 61.

The first oil discharging groove 65A, the second oil discharging groove 65B, the third oil discharging groove 65C, and the fourth oil discharging groove 65D are arranged apart from each other in a circumferential direction of the first sleeve 64. The details of the shapes of the oil discharging grooves 65A through 65D will be described below.

<Second Sleeve>

The second sleeve 66 shown in FIG. 1 is a tubular portion that is coupled to the housing 61 and through which the second output shaft 8B is inserted.

The second sleeve 66 extends from the housing 61 toward the opening end 9A of the gear case 9 along the X-axis. The second sleeve 66 allows the internal space of the housing 61 and the outside of the housing 61 (specifically, internal space in the gear case 9) to communicate with each other.

The second sleeve 66 is inserted into a differential case bearing 93. A central axis of the second sleeve 66 coincides with the axial center of rotation of the sun gear 2. An inner diameter of the second sleeve 66 is smaller than the maximum inner diameter of the housing 61.

As shown in FIG. 3, the second sleeve 66 includes a first projection 661 and a second projection 662. The first projection 661 and the second projection 662 each projects relative to other portions at an outer end 66A of the second sleeve 66 in an axial direction of a second side gear 75 (i.e., along the X-axis).

One end of the first projection 661 in a circumferential direction of the second sleeve 66 is provided in a position continuous with the first oil introducing groove 67A, and the other end is provided in a position continuous with the third oil introducing groove 67C.

In other words, the first projection 661 is provided in a region between an end of the first oil introducing groove 67A and an end of the third oil introducing groove 67C, at the outer end 66A of the second sleeve 66. The first projection 661 constitutes a guide for guiding oil into the first oil introducing groove 67A and the third oil introducing groove 67C.

The second projection 662 has the shape of the first projection 661 rotated around the axial center of rotation of the differential case 6 by 180°. One end of the second projection 662 in the circumferential direction of the second sleeve 66 is provided in a position continuous with the second oil introducing groove 67B (see FIG. 5), and the other end is provided in a position continuous with the fourth oil introducing groove 67D (see FIG. 5).

In other words, the second projection 662 is provided in a region between an end of the second oil introducing groove 67B and an end of the fourth oil introducing groove 67D, at the outer end 66A of the second sleeve 66. The second projection 662 constitutes a guide for guiding oil into the second oil introducing groove 67B and the fourth oil introducing groove 67D.

<Oil Introducing Groove>

As shown in FIG. 5, the first oil introducing groove 67A, the second oil introducing groove 67B, the third oil introducing groove 67C, and the fourth oil introducing groove 67D are provided on an inner circumferential surface of the second sleeve 66 and extend from the outer end 66A of the second sleeve 66 into the housing 61.

The first oil introducing groove 67A, the second oil introducing groove 67B, the third oil introducing groove 67C, and the fourth oil introducing groove 67D are arranged apart from each other in the circumferential direction of the second sleeve 66. The details of the shapes of the oil introducing grooves 67A to 67D will be described below.

<Differential Mechanism>

The differential mechanism 7 shown in FIG. 1 is a known mechanism that distributes and transmits rotation of the differential case 6 to the first output shaft 8A and the second output shaft 8B while rotating the first output shaft 8A and the second output shaft 8B at different speeds.

The differential mechanism 7 includes a first pinion gear 71, a second pinion gear 72 (see FIG. 5), a pinion shaft 73, a first side gear 74, and the second side gear 75. The differential mechanism 7 is situated inside the differential case 6. Specifically, the first pinion gear 71, the second pinion gear 72, the pinion shaft 73, the first side gear 74, and the second side gear 75 are housed in the housing 61 of the differential case 6.

<Pinion Gear and Pinion Shaft>

As shown in FIG. 5, each of the first pinion gear 71 and the second pinion gear 72 is a bevel gear having an axial center of rotation perpendicular to the axial center of rotation of the sun gear 2 (i.e., X-axis).

The axial center of rotation of the first pinion gear 71 and the axial center of rotation of the second pinion gear 72 coincide with each other. The first pinion gear 71 and the second pinion gear 72 are arranged opposite to each other. The first pinion gear 71 and the second pinion gear 72 have the same shape and are mirror images of each other.

The pinion shaft 73 supports the first pinion gear 71 and the second pinion gear 72 individually in a rotatable manner. A central axis (i.e., longitudinal direction) of the pinion shaft 73 is perpendicular to the X-axis. The pinion shaft 73 is fixed to the housing 61 and does not rotate with respect to the differential case 6. In other words, the pinion shaft 73 rotates together with the housing 61 around the axial center of rotation of the sun gear 2.

<Side Gear>

As shown in FIG. 1, each of the first side gear 74 and the second side gear 75 is a bevel gear having an axial center of rotation that coincides with the axial center of rotation of the sun gear 2 (i.e., X-axis).

The axial center of rotation of the first side gear 74 and the axial center of rotation of the second side gear 75 coincide with each other. The first side gear 74 and the second side gear 75 are arranged opposite to each other.

The first side gear 74 is arranged closer to the motor shaft 10 than the second side gear 75 along the X-axis. The first side gear 74 and the second side gear 75 have the same shape and are mirror images of each other.

The first side gear 74 and the second side gear 75 are each held by the housing 61 in a rotatable manner. The first side gear 74 meshes with the first pinion gear 71 and the second pinion gear 72 and is coupled to the first output shaft 8A. The second side gear 75 meshes with the first pinion gear 71 and the second pinion gear 72 and is coupled to the second output shaft 8B.

The first side gear 74 and the second side gear 75 rotate together with the differential case 6 and, at the same time, also relatively rotate relative to the differential case 6 by rotation transmitted from the first pinion gear 71 and the second pinion gear 72.

<Output Shaft>

The first output shaft 8A and the second output shaft 8B are spline-fitted to the first side gear 74 and the second side gear 75, respectively.

The first output shaft 8A and the second output shaft 8B each output rotation to a wheel of an automobile. The first output shaft 8A and the second output shaft 8B rotate in accordance with a direction of rotation of the motor shaft 10 (i.e., direction of rotation of the differential case 6) while rotating at different speeds by the differential mechanism 7 coupled thereto.

<Gear Case>

The gear case 9 houses the sun gear 2, the ring gear 3, and the planetary gears 4 and supports the differential case 6 in a rotatable manner.

The gear case 9 includes a first body 91, a second body 92, the differential case bearing 93, and an oil guide 94. The first body 91 and the second body 92 are coupled to each other, thereby forming the planetary gear accommodation space that accommodates the gears and the differential case 6. Inside the second body 92, a motor (not shown) serving as a drive source is located.

The first body 91 has the opening end 9A through which the second output shaft 8B is inserted. In the planetary gear accommodation space in the gear case 9, lubricating oil for lubricating the gears and shafts is stored. The planetary gear accommodation space is sealed with a sealing member or the like.

The differential case bearing 93 supports the differential case 6 in a rotatable manner. Specifically, the second sleeve 66 of the differential case 6 is inserted through the differential case bearing 93. The differential case bearing 93 is held by the first body 91. The differential case bearing 93 is a shielded bearing through which the lubricating oil supplied from the oil guide 94 can flow.

Figure 6:
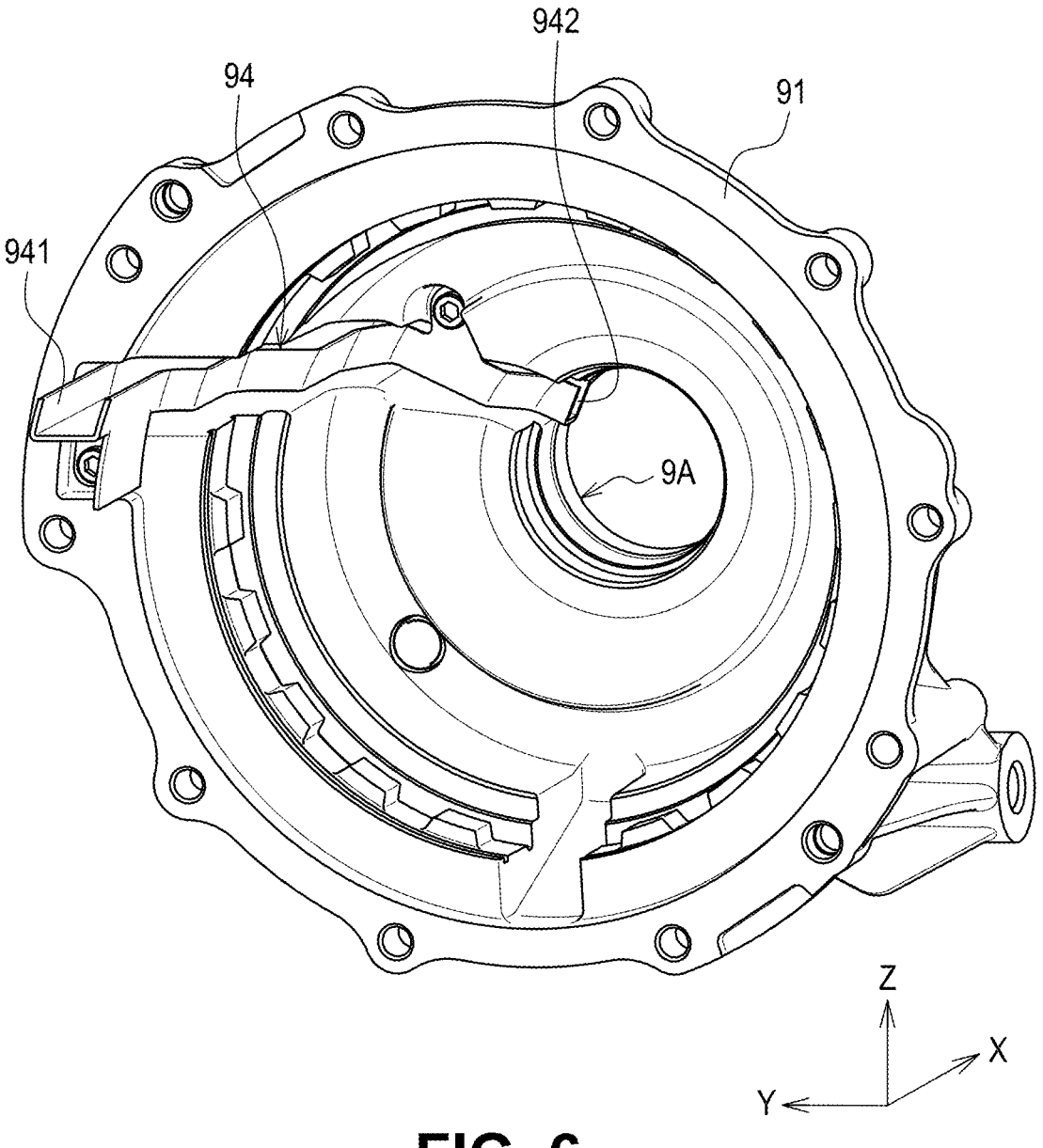
FIG. 6 is a schematic perspective view of a portion of a gear case in the transmission device of FIG. 1.
Figure 7:
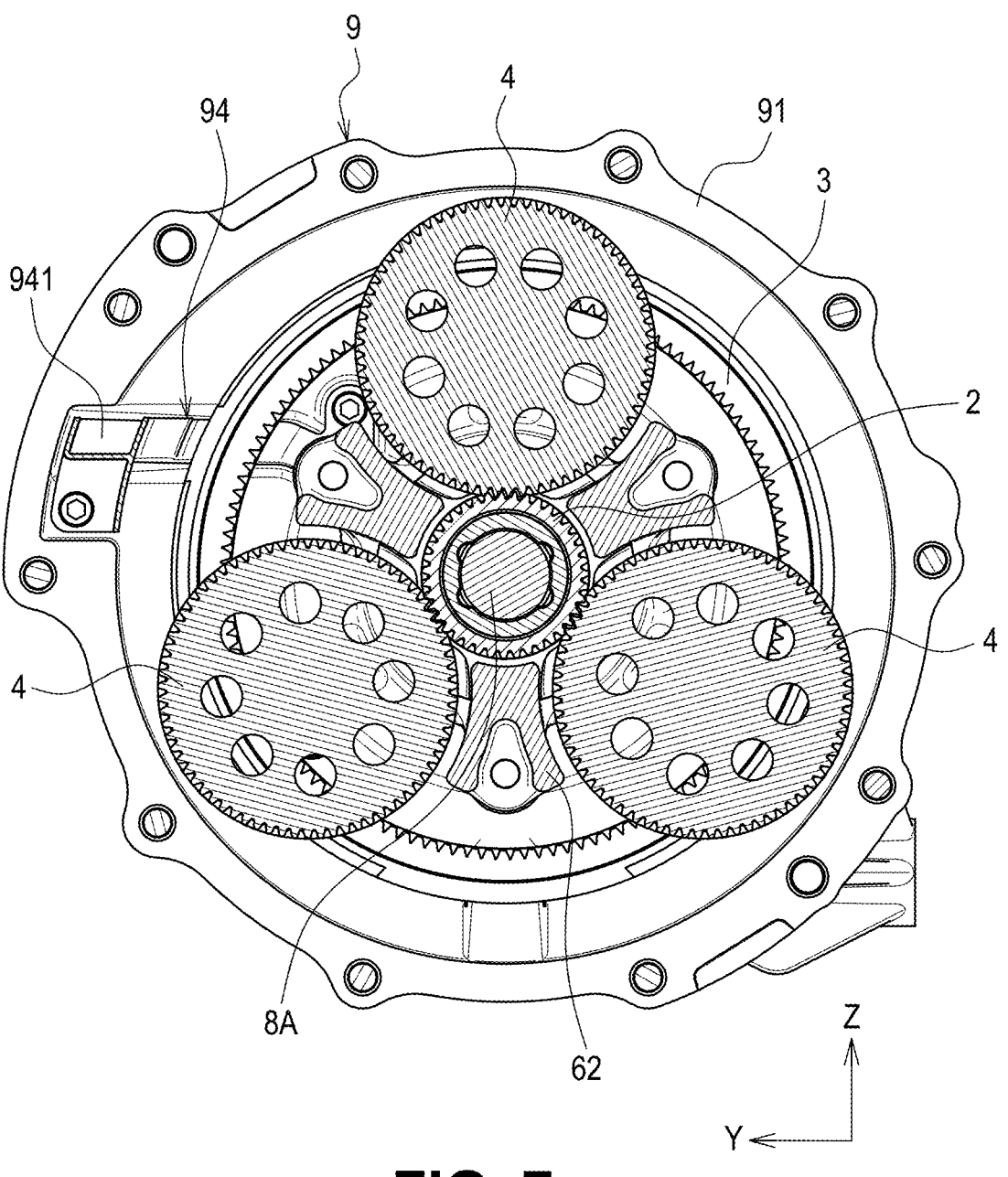
FIG. 7 is a schematic cross-sectional view taken along VII-VII line of FIG. 1.

The oil guide 94 shown in FIG. 6 and FIG. 7 is a flow channel that has a gutter-like shape and that is arranged in the planetary gear accommodation space. An inlet 941 of the oil guide 94 is arranged above the axial center of rotation of the sun gear 2 and on a radially outer side relative to an orbit of revolution of the planetary gears 4. The inlet 941 is arranged in a position overlapping with the first gear parts 41 of the planetary gears 4 in the radial direction of the sun gear 2.

In FIG. 7, when an automobile moves forward, the sun gear 2 and the differential case 6 rotate clockwise, and each planetary gear 4 revolves clockwise while rotating counterclockwise around its own axis. The direction of rotation of each component when the automobile moves backward is opposite to the direction when the automobile moves forward.

The lubricating oil stored in a lower portion of the planetary gear accommodation space is scooped up by the revolving planetary gear 4, and then is dripped into the inlet 941. This allows the lubricating oil to be supplied into the oil guide 94.

An outlet 942 of the oil guide 94 is located below the inlet 941 and in the vicinity of an upper end of the outer end 66A of the second sleeve 66 of the differential case 6 (see FIG. 1). The lubricating oil supplied from the inlet 941 to the oil guide 94 flows down within the oil guide 94 and is supplied to the vicinity of the second sleeve 66.

As shown by an arrow in FIG. 2, the lubricating oil that has been supplied to the vicinity of the second sleeve 66 passes through the second sleeve 66 and is supplied to the interior of the housing 61. This allows the differential mechanism 7 to be lubricated. The lubricating oil inside the differential mechanism 7 passes through the first sleeve 64 and is discharged to an interior of the sun gear 2 (i.e., a connection member).

The lubricating oil that has been discharged to the interior of the sun gear 2 is discharged from the communication holes 23 into the planetary gear accommodation space, and then is stored again in the lower portion of the planetary gear accommodation space. The lubricating oil stored in the planetary gear accommodation space is supplied to the oil guide 94 by the planetary gears 4 as described above. The lubricating oil is circulated in the gear case 9 in this manner.

A portion of the lubricating oil that has been supplied to the vicinity of the second sleeve 66 is not supplied to the housing 61, but passes through a shield of the differential case bearing 93, and then flows down below the second sleeve 66 and the housing 61, and is stored in the lower portion of the planetary gear accommodation space.

<Supply of Lubricating Oil to Planetary Gear Bearing>

Figure 8:
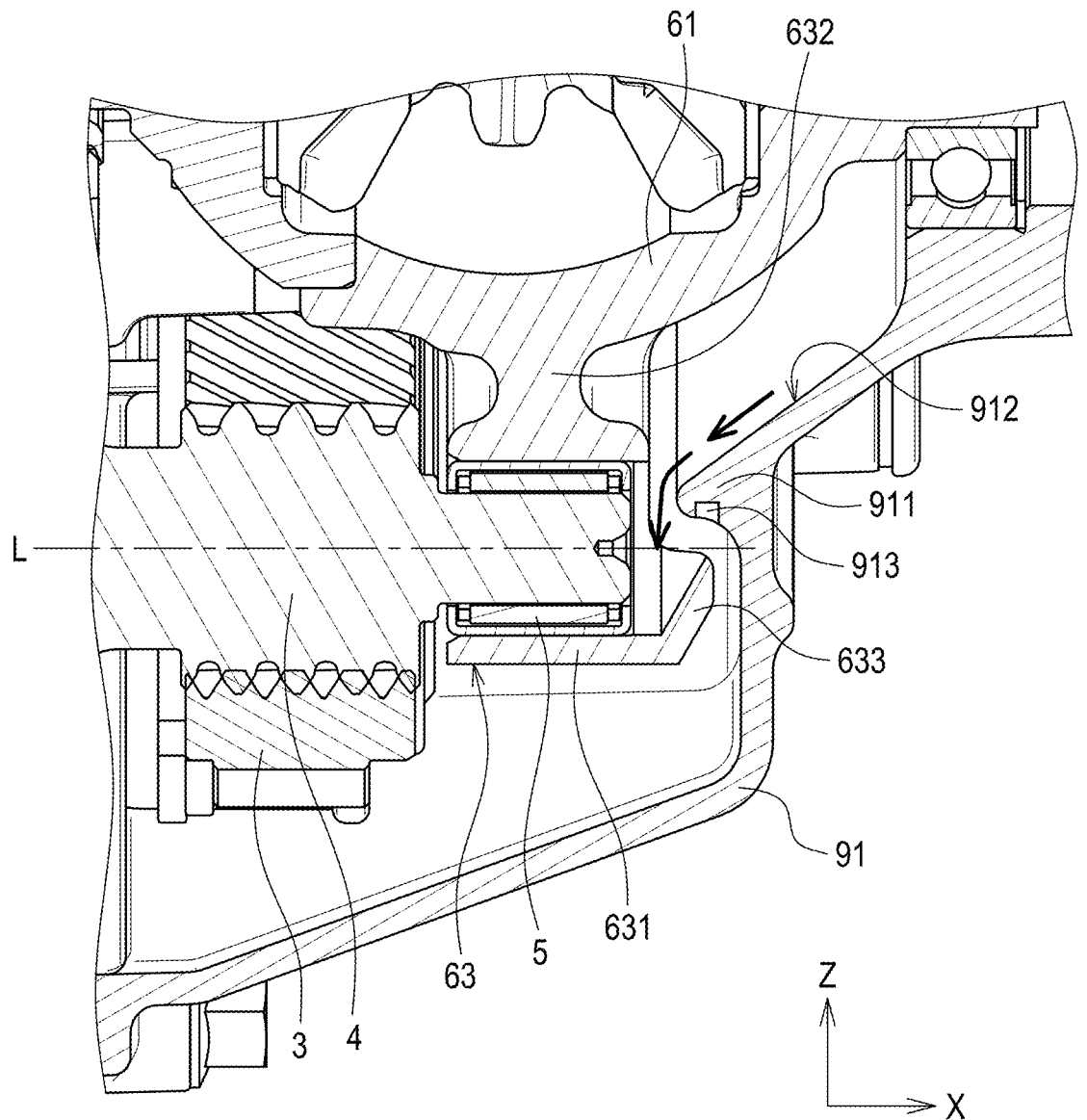
FIG. 8 is a partially enlarged view of FIG. 2.

As shown in FIG. 8, a portion of the lubricating oil is supplied to each planetary gear bearing 5 along an inner circumferential surface of the first body 91 of the gear case 9. A flow of the lubricating oil will be described in detail below.

The first body 91 of the gear case 9 includes a protrusion 911, an inclined surface 912, and a recess 913. The protrusion 911 is arranged to overlap with the pocket 633 of each bearing holder 63 from the radially inner side of the sun gear 2 and protrudes toward the planetary gear bearings 5 in the axial direction of the sun gear 2.

In other words, the protrusion 911 is a portion protruding from an inner surface of the first body 91 and covering a portion of an opening of each pocket 633. The protrusion 911 is located closer to the radially inner side of the sun gear 2 than a rotational axis L of each planetary gear 4 (i.e., a central axis of each planetary gear bearing 5).

In the present embodiment, the protrusion 911 is formed into an annular shape viewed along the axial direction of the sun gear 2. In other words, the protrusion 911 is provided in the entire circumferential direction of the first body 91. However, the protrusion 911 may be provided only on the lower portion of the first body 91 (for example, a portion below the axial center of rotation of the sun gear 2).

The inclined surface 912 is inclined, toward the protrusion 911, from a position that is farther from the planetary gear bearings 5 than the protrusion 911 in the axial direction of the sun gear 2 and that is on an inner side relative to the protrusion 911 in the radial direction of the sun gear 2.

In other words, the inclined surface 912 is formed of a portion of the inner surface of the first body 91 that extends from the protrusion 911 toward the opening end 9A. The inclined surface 912 may be formed of a flat surface, or may be curved or bent.

The recess 913 is a portion that is arranged in a back surface of the protrusion 911 on the radially outer side of the sun gear 2 (i.e., a surface opposite to the inclined surface 912) and that also is recessed toward the radially inner side of the sun gear 2. The recess 913 is a groove extending along the circumferential direction of the sun gear 2. The recess 913 may be provided in the entire circumferential direction of the first body 91, or may be provided only at the lower portion of the first body 91 (for example, a portion where the lubricating oil entering the recess 913 falls down).

As shown by an arrow in FIG. 8, the lubricating oil that passes through the shield of the differential case bearing 93 via the oil guide 94 and that flows down below the second sleeve 66, or the lubricating oil that does not pass through the oil guide 94 but directly reaches the inclined surface 912 due to splashing in the gear case 9 moves toward the protrusion 911 along the inclined surface 912. The lubricating oil that reaches the protrusion 911 falls downward from its tip end, and is collected in the pocket 633.

The lubricating oil that has moved around from the tip end of the protrusion 911 to the back surface of the protrusion 911 is removed from the back surface of the protrusion 911 through the recess 913. Accordingly, the lubricating oil is inhibited from flowing below the pocket 633 along the inner surface of the first body 91.

<Shapes of Oil Supply Groove and Oil Discharging Groove>

As shown in FIG. 5, the oil introducing grooves 67A through 67D each reach the internal space of the housing 61 at a radially outside of the second side gear 75 relative to the second side gear 75, when viewed along an axial direction of the second side gear 75 (i.e., direction parallel to the X-axis). Exit ends of the oil introducing grooves 67A through 67D each have portions that do not overlap with the second side gear 75 that is rotating.

Further, the oil introducing grooves 67A through 67D are each arranged such that the oil introducing grooves 67A through 67D overlap with neither the first pinion gear 71 nor the second pinion gear 72, when viewed along the axial direction of the second side gear 75.

The first oil introducing groove 67A and the second oil introducing groove 67B are arranged side by side, between the first pinion gear 71 and the second pinion gear 72, in a circumferential direction of the second side gear 75. The shape of the second oil introducing groove 67B is symmetrical with that of the first oil introducing groove 67A with respect to a virtual plane perpendicular to the Y-axis.

The shape of each of the third oil introducing groove 67C and the fourth oil introducing groove 67D is symmetrical with the shape of the first oil introducing groove 67A or the second oil introducing groove 67B with respect to a virtual plane perpendicular to the Z-axis. That is, the third oil introducing groove 67C and the fourth oil introducing groove 67D are arranged opposite to the first oil introducing groove 67A and the second oil introducing groove 67B across the pinion shaft 73, and are arranged side by side, between the first pinion gear 71 and the second pinion gear 72, in the circumferential direction of the second side gear 75.

The oil introducing grooves 67A through 67D each extend linearly. In other words, a line connecting the center points of each of the oil introducing grooves 67A through 67D in its width direction is a straight line. Further, the oil introducing grooves 67A through 67D each increase in width toward the housing 61. In other words, the width of each of the oil introducing grooves 67A through 67D is minimum at the outer end 66A of the second sleeve 66 and is maximum in the interior of the housing 61.

Figure 9A:
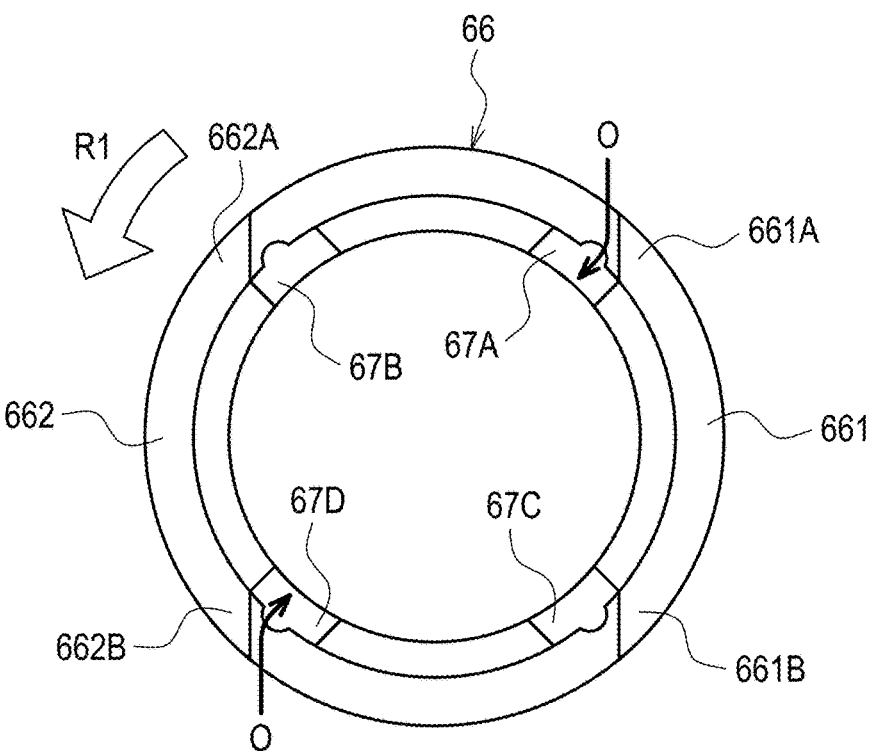
FIG. 9A is a schematic diagram showing a state in which the differential case relatively rotates in a first direction.
Figure 9B:
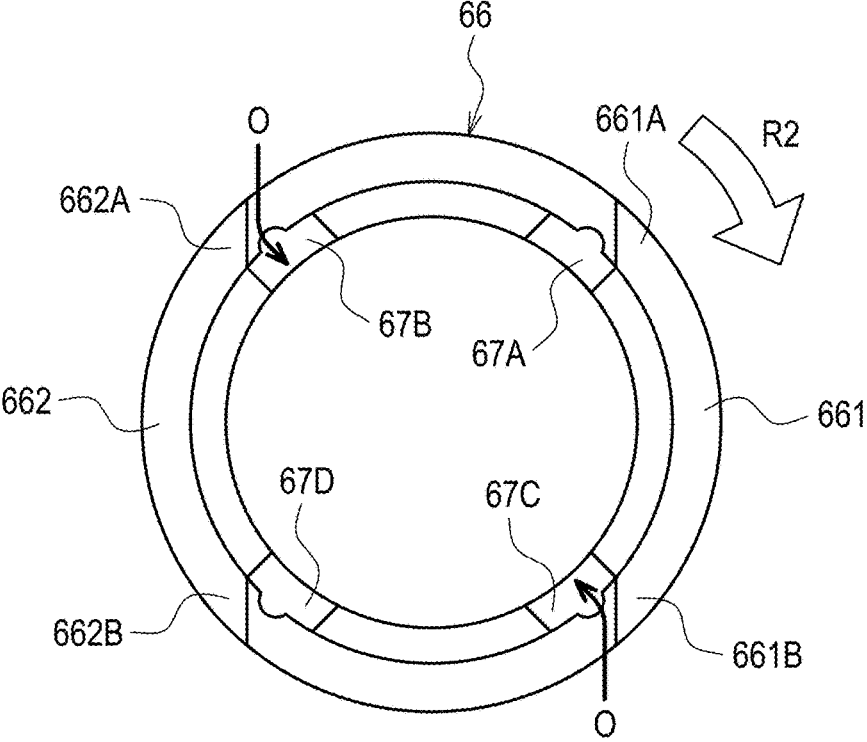
FIG. 9B is a schematic diagram showing a state in which the differential case relatively rotates in a second direction.

As shown in FIG. 9A and FIG. 9B, the first oil introducing groove 67A and the second oil introducing groove 67B are located between the first projection 661 and the second projection 662 of the second sleeve 66 in the circumferential direction of the second side gear 75 (i.e., circumferential direction of the second sleeve 66), and also the third oil introducing groove 67C and the fourth oil introducing groove 67D are located between the first oil introducing groove 67A and the second oil introducing groove 67B in the other region.

Specifically, ends of each of the first oil introducing groove 67A and the second oil introducing groove 67B are located in a region between a first end portion 661A of the first projection 661 and a first end portion 662A of the second projection 662. Ends of each of the third oil introducing groove 67C and the fourth oil introducing groove 67D are located in a region between a second end portion 661B of the first projection 661 and a second end portion 662B of the second projection 662.

As shown in FIG. 9A, when the differential case 6 relatively rotates relative to the second output shaft 8B in a first direction R1, the lubricating oil O in the planetary gear accommodation space hits the first end portion 661A of the first projection 661 and is guided into the first oil introducing groove 67A. Alternatively, the lubricating oil O hits the second end portion 662B of the second projection 662 and is guided into the fourth oil introducing groove 67D.

As shown in FIG. 9B, when the differential case 6 relatively rotates in a second direction R2, which is opposite to the first direction R1, relative to the second output shaft 8B, the lubricating oil O in the planetary gear accommodation space hits the second end portion 661B of the first projection 661 and is guided into the third oil introducing groove 67C. Alternatively, the lubricating oil O hits the first end portion 662A of the second projection 662 and is guided into the second oil introducing groove 67B.

Figure 10:
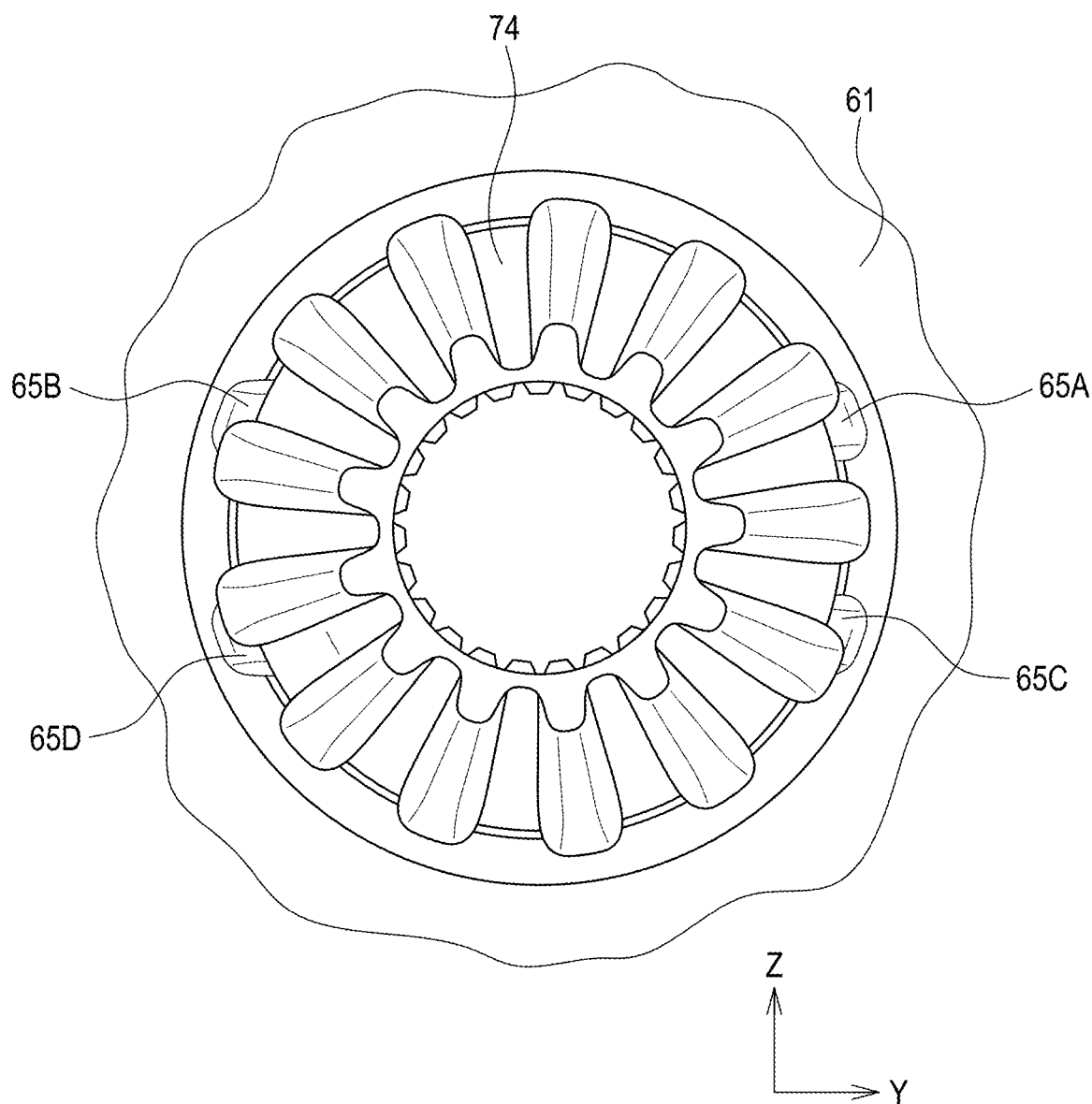
FIG. 10 is a schematic front view of a portion of the differential case of FIG. 3.

As shown in FIG. 10, the oil discharging grooves 65A through 65D each reach the internal space of the housing 61 at a radially outside of the first side gear 74 relative to the first side gear 74, when viewed along an axial direction of the first side gear 74 (i.e., the direction parallel to the X-axis). Exit ends of the oil discharging grooves 65A through 65D each have portions that do not overlap with the first side gear 74 that is rotating.

FIG. 10 is a diagram of the interior of the housing 61 viewed from the second sleeve 66. The first pinion gear 71, the second pinion gear 72, the pinion shaft 73, and the second side gear 75 are omitted in FIG. 10.

The oil discharging grooves 65A through 65D are each arranged in a position overlapping with the first pinion gear 71 or the second pinion gear 72, when viewed along the axial direction of the first side gear 74. Further, the oil discharging grooves 65A through 65D are each arranged between any two of the oil introducing grooves 67A through 67D in a circumferential direction of the first side gear 74, when viewed along the axial direction of the first side gear 74.

As shown in FIG. 4, the oil discharging grooves 65A through 65D each extend linearly. Further, the oil discharging grooves 65A through 65D each increase in width toward the outer end 64A of the first sleeve 64. In other words, the width of each of the oil introducing grooves 67A through 67D is minimum at the housing 61 and is maximum in the inner side than the outer end 64A of the first sleeve 64.

[1-2. Effects]

According to the embodiments described in detail above, the following effects can be achieved.

(1a) The oil discharging grooves 65A-65D enables the oil to be efficiently discharged from the interior of the housing 61. This enhances the oil supply to the housing 61. As a result, the lubricity of the differential mechanism 7 can be enhanced without using a pump.

(1b) The oil introducing grooves 67A-67D each have a wider width, thereby allowing the oil to be efficiently supplied to the differential mechanism 7 by centrifugal force resulting from rotation of the differential case 6.

(1c) The communication member (i.e., the sun gear 2), which includes the communication hole 23, enables the oil discharged from the housing 61 to be returned, over a short distance, to a speed reduction system including the sun gear 2. As a result, the oil circulation can be improved.

(1d) The enlarged diameter part 22 of the sun gear 2, which is the communication member, includes the communication holes 23, thereby allowing the oil to be stored in the enlarged diameter part 22. This promotes the oil discharge through the communication holes 23.

2. Other Embodiments

Although the embodiment of the present disclosure has been described above, it is to be understood that the present disclosure is not limited to the above-described embodiment, but may be implemented in various forms.

(2a) In the transmission device of the above-described embodiment, the oil introducing groove does not necessarily have to be shaped in a straight line. For example, the oil introducing groove may be spiral-shaped.

(2b) In the transmission device of the above-described embodiment, the number of oil introducing grooves and the number of oil discharging grooves each are not limited to four. For example, the number of oil introducing grooves and the number of the oil discharging grooves are each not limited to the number being equal to or less than three (inclusive of one).

(2c) In the transmission device of the above-described embodiment, the sun gear does not necessarily have to function as the communication member. For example, the motor shaft may function as the communication member including the communication hole. Alternatively, the communication member may be provided as a member separated from the sun gear and the motor shaft. Further, the communication member does not necessarily have to include the enlarged diameter part.

(2d) Two or more functions of one component in the above-described embodiments may be distributed as two or more components, or the functions of two or more components may be integrated into a single component. Also, a portion of the configurations of the embodiments may be omitted. At least a portion of the configurations of the embodiments may be added to or replaced with other configurations of the embodiments. It is to be noted that any form included in the technical idea defined by the word of the appended claims may be an embodiment of the present disclosure.

The invention claimed is:

1. A transmission device, comprising:
a sun gear;
a ring gear arranged concentrically with the sun gear;

planetary gears meshing with the sun gear and with the ring gear;

a differential case supporting the planetary gears in a rotatable manner;

a differential mechanism arranged inside the differential case;

a first output shaft and a second output shaft that are coupled to the differential mechanism; and a gear case supporting the differential case in a rotatable manner, wherein the differential mechanism includes:

a first pinion gear and a second pinion gear that each have an axial center of rotation perpendicular to an axial center of rotation of the sun gear and that face each other;

a first side gear and a second side gear that each have an axial center of rotation coincident with the axial center of rotation of the sun gear and that face each other, the first side gear meshes with the first pinion gear and with the second pinion gear, and is coupled to the first output shaft, the second side gear meshes with the first pinion gear and with the second pinion gear, and is coupled to the second output shaft, the differential case includes:

a housing in which the first pinion gear, the second pinion gear, the first side gear, and the second side gear are housed;

a first sleeve that is coupled to the housing and through which the first output shaft is inserted;

a second sleeve that is coupled to the housing and through which the second output shaft is inserted;

at least one oil discharging groove that is provided on an inner circumferential surface of the first sleeve and that extends from an outer end of the first sleeve to an interior of the housing; and at least one oil introducing groove that is provided on an inner circumferential surface of the second sleeve and that extends from an outer end of the second sleeve to the interior of the housing, and the at least one oil discharging groove reaches an internal space of the housing at a radial outside of the first side gear, and increases in width toward the outer end of the first sleeve, as viewed in an axial direction of the first side gear.

2. The transmission device according to claim 1, wherein the at least one first oil introducing groove increases in width toward the housing.

3. The transmission device according to claim 1, wherein the sun gear includes a communication hole that allows an opening at the outer end of the first sleeve to communicate with an external space of the sun gear, and the sun gear overlaps with the first sleeve in a radial direction of the sun gear.

4. The transmission device according to claim 3, wherein the sun gear includes the communication hole and an enlarged diameter part having an inner diameter that is larger than the outer end of the first sleeve.

\* \* \* \* \*